March 22, 1932.  J. G. BROWNE  1,850,917
NUT LOCK
Filed June 28, 1929
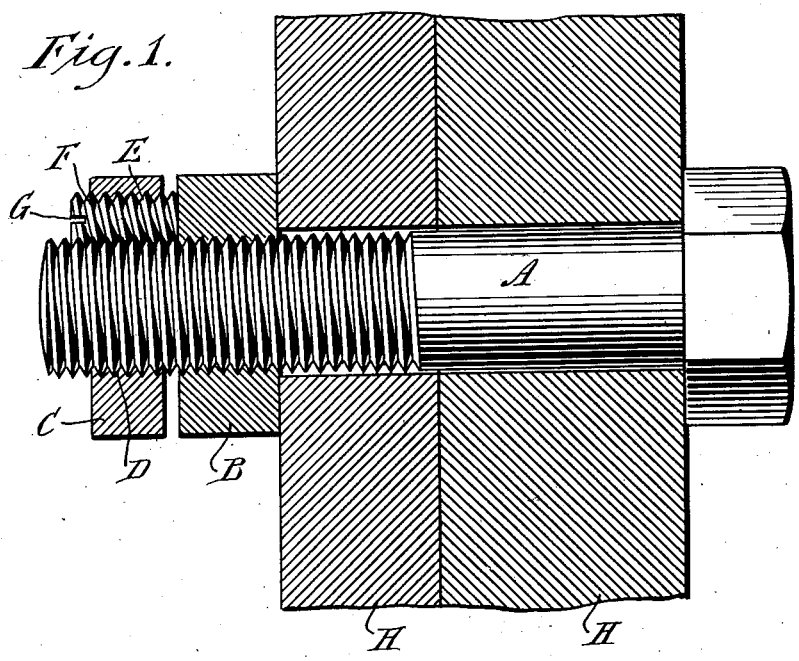
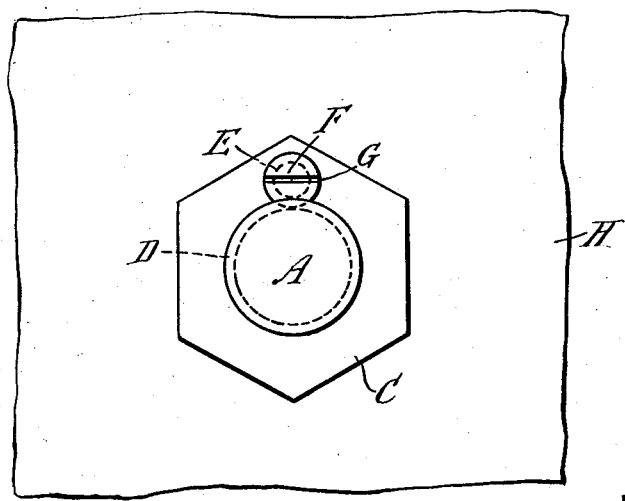
WITNESSES
Edw. Thorpe
Hugh H. Ott
INVENTOR
Joseph G. Browne
BY
ATTORNEY Patented Mar. 22, 1932

1,850,917

UNITED STATES PATENT OFFICE

JOSEPH G. BROWNE, OF BROOKLYN, NEW YORK

NUT LOCK

Application filed June 28, 1929. Serial No. 374,448.

This invention relates to devices for locking a nut on a threaded shank or spindle to prevent accidental retrograde movement thereof.

The invention primarily aims to provide an improved nut locking device by virtue of which loosening of the nut is positively precluded, and this without cutting, slotting or otherwise altering the threaded shank or spindle to which the nut is applied.

The invention further comprehends a nut lock which may be used in conjunction with an ordinary nut to hold the same against turning movement by and with a rotary element carried by the shank or spindle.

Other objects of the invention reside in the provision of a nut lock or lock nut which is comparatively simple in its construction and mode of use, inexpensive to produce and which is thoroughly reliable and highly efficient in its purpose.

With the above recited and other objects in view, reference is had to the following description and accompanying drawings, in which there is exhibited one example or embodiment of the invention, while the claims define the actual scope of the same:

In the drawings:

Figure 1 is a sectional view illustrating the nut locking device in its applied position.

Figure 2 is a front view thereof.

Referring to the drawings by characters of reference, A designates a threaded shank upon which an ordinary nut B is arranged. In order to provide means for locking the nut B against retrograde turning movement, a locking device is employed which consists of a lock nut C, the body of which is formed with a pair of communicating parallel threaded bores D and E, the threads of which are of the same size and pitch. The bore D is adapted to receive the threaded shank A upon which the lock nut C is arranged and a threaded stud F is arranged in the other bore in a manner whereby the threads thereof interengage with the threads of the shank A. This interengagement of threads is perfectly normal, that is to say, the threads and the stud F engage with the threads of the shank A in a natural manner, there being no distortion or mutilation whatever. The stud F is formed with a kerf G at its outer end for the reception of a screw driver or other tool for manipulating the same.

In use, after the nut B has been tightened against the objects H which are to be clamped, the lock nut C is turned on the shank A to a point in closely spaced relation to the nut B. During this turning movement of the lock nut C, the threads of the stud freely turn around the threads of the shank A for a reason presently explained. The stud F is then threaded axially through the body of the lock nut C until its inner terminal impinges with the nut B to effect a binding pressure between the threads of the shank and stud and the threads of the nut B and C. This binding pressure occurs by virtue of a slight canting of the nut C. The result of this canting is an upward pressure of the threads of the stud F and the immediately adjacent threads of the bore D against the nether parts of the threads of the bolt A on one side of the device, and a downward pressure of the threads of the bore D against the top parts of the threads of the bolt A on the other side of the device. It has been demonstrated many times in actual practice that an extremely tight mutual grip will be gotten with the outstanding advantage that none of the threaded parts will become mutilated. Where the objects H are stationary or nonrotary, the ordinary nut B may be dispensed and the lock nut C alone may be used. In this instance, the threaded stud F directly impinges against the object H. Where the object H is adapted to rotate on the shank A, the ordinary nut B must be employed for the proper operation of the device. In practice, the locking device may be used in conjunction with a cotter pin, if desired. For heavy duty work, two studs F may be employed on the lock nut, preferably at diametrically opposite sides of the threaded bore D. Now as to the reason why the threads of the stud F turn freely around the threads of the shank A.

The threads of the bore D are "timed" with the threads of the bore E. In order to understand this it is necessary to make brief reference to the mode of manufacture of the nut C. After the bore D has been tapped, presuming both bores D and E to have been drilled through the nut C, a bolt similar to A is screwed into the bore D so as to constitute a guide for the smaller tap which is presently to cut the threads in the bore E.

It will be understood in a moment that with the end of a bolt protruding from the bore D, the threads of the bolt will serve as a guide for the threads of the tap. When the latter is now driven into the bore E it will be found that the crests of the threads in the bore E will coincide with the valleys of the threads in the bore D. It is in this respect that the threads of the bores E and D are timed as stated.

This condition is absolutely essential to the expeditious and easy application of the nut C to the bolt A with the stud F in place. The crests of the teeth of the stud F will exactly register with the crests of the teeth of the bore D because of the previously stated fact of coincidence of the thread valleys and crests of the bores D and E respectively. Were it not for this registration there would be binding between the stud F and the threaded end of the bolt A.

In drilling the bores D and E account must be taken of that extent of overlap which will agree with the tooth depth of the bolt A and stud F. In other words, the bore E must extend, so to speak, into the bore D an extent equal to the depth of the teeth of the stud F so that when the latter is in place (Fig. 1) the crests of the teeth exposed at the bore D will reach out no further than the valleys of the teeth of the bolt A. This is another factor contributing to the prevention of binding.

What is claimed is:

1. A nut locking device including in combination with the body of a nut, means extending axially through the body of said nut for impingement with a stationary element to exert an axial binding pressure between the threads of the nut and the threads of a shank upon which the nut is threaded.

2. A nut locking device including in combination with the body of a nut, a threaded stud extending axially through the body of said nut for impingement with a stationary element to exert an axial binding pressure between the threads of the nut and the threads of a shank upon which the nut is threaded.

3. A lock nut including a body having a threaded aperture for receiving a threaded shank and means extending axially through said nut for engagement with a stationary element to exert an axial binding pressure on the nut by impingement of the nut and shank threads.

4. The combination with a threaded shank and a nut engaging the same, of means for locking the nut against retrograde movement comprising a threaded stud extending axially through the nut, said stud having threads of the same size and pitch as the shank for interengagement with the threads of said shank.

5. The combination with a nut having a threaded bore for engagement with a threaded shank, of means for locking the nut on the shank against retrograde movement comprising a second threaded bore in the nut in communication with the first bore and a threaded stud in the second bore having threads in registration with the threads of the first bore for normal interengagement with the threads of the shank.

6. A nut lock including in combination a nut body having parallel communicating threaded bores, the threads of which are of the same size and pitch, one of which bores is adapted to receive a threaded shank upon which the nut is mounted, and a threaded stud screwed into the other bore having its threads in registration with the threads of the shank bore and in interengagement with the threads of said shank.

7. A nut lock including in combination a nut body having parallel communicating threaded bores, the threads of which are of the same size and pitch, one of which bores is adapted to receive a threaded shank upon which the nut is mounted and a threaded stud screwed into the other bore, the threads of which interengage with the threads of said shank, said stud being adapted for impingement with a stationary element on said shank to cant the nut body on said shank and effect a binding pressure between the threads of the shank, stud and nut.

8. The combination of a bolt having a uniformly threaded shank portion, a nut in threaded engagement with the bolt and an element in threaded engagement with the nut and bolt and adapted to exert pressure on a part adjacent one face of the nut as and for the purpose specified.

9. The combination of a bolt having a uniformly threaded shank portion, a nut in threaded engagement with the bolt and an element carried by said nut and adapted to engage and exert a direct pressure between said bolt, the nut and a part arranged adjacent said nut.

10. The combination of a bolt having a uniformly threaded shank portion, a nut in threaded engagement with the bolt and a threaded element carried by said nut for engaging and exerting a direct pressure between the threaded portion of said bolt, the end and a part arranged adjacent said nut.

11. A nut lock comprising a nut having communicating bores, threads in said bores, the thread crests of one bore coinciding with the thread valleys of the other bore, and a screw stud occupying one of the bores, the threads of said stud registering with the threads of the remaining bore.

12. A nut lock comprising a nut having overlapping hence communicating bores, threads of identical size and pitch in the bores, the extent of overlap of the bores being equal to the depth of the threads, the crests and valleys of the teeth in said bores coinciding at the place of communication between the bores, and a screw stud occupying one of the bores having its threads in registration with the threads of said bore and partly extending into the other bore and thereby completing said other bore at said place of communication.

13. A locking device comprising a uniformly threaded bolt, a similarly threaded nut screwed on the bolt, a similarly threaded lock nut also screwed on the bolt into confronting relationship with the first nut, said lock nut having a threaded bore, and a stud screwed into said bore into contact with the adjoining face of said first nut for the exertion of pressure against said face and the canting of said lock nut.

14. A nut lock comprising a nut to be screwed upon a bolt shank, and manually operative pressure means carried by the nut to bring pressure to bear against a fixed abutment and cause a canting of the nut on the shank to bind the threads.

Signed at New York, in the county of New York and State of New York, this 27th day of June, 1929.

JOSEPH G. BROWNE.